Dec. 12, 1933. H. G. METCALF Re. 19,019

ROPE

Original Filed June 25, 1927

Inventor

Harold G. Metcalf

By Chas. E. Thum his Attorneys

Reissued Dec. 12, 1933

Re. 19,019

UNITED STATES PATENT OFFICE 19,019

ROPE

Harold G. Metcalf, Auburn, N. Y., assignor to Columbian Rope Company, Auburn, N. Y., a corporation of New York Original No. 1,812,354, dated June 30, 1931, Serial No. 201,339, June 25, 1927. Application for reissue August 13, 1932. Serial No. 628,759

11 Claims. (Cl. 117—53)

In the manufacture of rope and cordage the customary practice is to assemble the fibers in the form of yarns or slivers and these yarns or slivers are formed into the rope and cordage by twisting or laying operations. In some few instances, the slivers are enclosed in covering layers to form either a completed rope or a member of a completed rope. In all instances, it is customary to supply the rope or cordage when designed for a large class of uses with a lubricating material or a lubricating and preservative material, the object being to prolong the life of the fiber when the rope or cordage is subjected to heavy use as well as to preserve the same against deterioration or injury through fungoid or bacterial action. Unfortunately, however, practice has demonstrated that, with all material so far added to the fiber in the structure of the rope or cordage, it has been practically impossible to maintain effective water-proof conditions or to retain the lubricant, no matter whether it be an oil, a graphite or similar substance, at the center of the rope or cordage. Consequently, after considerable use, this added material which is quite effective when the rope or cordage is new, works out and is lost, whereupon, the rope begins to deteriorate through any one or all of the causes which ultimately results in its destruction.

It is one object of the present invention to incorporate in a rope a material which will, in a large measure, overcome the difficulties heretofore experienced, and, in addition impart to the rope or cordage those qualities which have heretofore been believed to be unattainable. Some of the advantages gained by the present invention, are, more effective waterproofing of the rope or cordage; a reduction of the wear on the fibers under load by improving the lubricating qualities of the filler by the inclusion therein of latex, or a latex compound, or a mixture of rubber with natural or artificial resins; the ability to combine the individual fibers for greater strength and wear resistance, to prevent fuzziness, to do away with the necessity of twisting to the degree which has heretofore been deemed necessary in both those classes of cordage making use of slivers as distinguished from yarns, as well as where yarns are employed. In other words, the present invention contemplates the provision of means for holding the fibers in proper relation with respect to each other and in a more or less substantially straight condition, more nearly parallel with the axis of the rope or cordage, thereby eliminating the imposition of what is termed cross strains on the fibers so as to avoid the cutting of the fibers which action, as will be appreciated, reduces the strength of the rope or cordage very materially.

Most of the ropes of the prior art and especially those adapted for maritime uses as well as to other uses under which they must sustain heavy loads such as drilling cable, hoisting ropes, and transmission ropes for transmitting power, are usually composed of three or more separately formed elements known in the art as readies or strands laid together to form what is termed laid or cable-laid rope. When heavy loads are placed on ropes of this character it quite often happens that substantially the entire load is carried by two of the elements, under which circumstances those two load sustaining elements are drawn inward or toward the center of the rope structure with the result that the third element is pinched or extruded outwardly so as to lie outside of the exterior faces of the other two elements. With this third element thus projected, its exterior surface is not only exposed, but is actually worn, by surrounding objects to a much greater degree than in the case of the other two elements sustaining the load. This rubbing, chafing, or wearing of the third element causes that element to become severed or broken before the maximum degree of wear has been imposed upon the other two elements. In view of this, the present invention also contemplates a heavy load rope wherein all of its component parts necessarily assist in carrying the load or wherein no one element will be compelled to sustain a greater degree of wear than any other degree of element. More specifically stated, the invention consists in forming and laying up the rope by cementing and joining together the individual fibers, preferably, but not necessarily, in untwisted condition or yarns. This joining together of the fibers is obtained by the use of a vulcanizable compound such as a commercial latex on the market today, the finished rope being preferably round or circular in cross section. In this way, no one portion can be placed in a position where it must sustain a greater degree of chafing or wear than any other portion, the circular rope presenting a continuous, unbroken, wear resisting surface. Or, stated differently, there is a larger area of wearing surface over which the wear will be distributed as compared with the present day types of rope. The use of a vulcanizable latex compound is preferred, of course, where it is desired to cement or bind the entire body of fibers or other structural elements of the rope together but, aside from this bonding feature, the lubricating properties of the latex may best be taken advantage of by permitting the latex in the interior of the rope to remain unvulcanized as is more fully described hereinafter.

As before stated, the invention contemplates the construction of a rope wherein the fibers may be untwisted or only slightly twisted, twisting of the fibers having the effect of placing a cross strain on them and thereby reducing their tensile strength. Preferably these several objects can be accomplished by forming the rope with the untwisted or slightly twisted fibers or all the yarns embedded in a vulcanizable compound, the fibers or yarns all extending parallel to each other and to the longitudinal axis of the finished product or taking approximately the twist of the formed strand.

In order to further increase the life of the rope the fibers thereof, in addition to being joined or cemented together by the vulcanizable compound, may also be protected from chafing or rubbing by having the exterior surfaces of the elements constituting the rope provided with a protective covering of the vulcanized material. Such covering is not necessary or essential in all classes of ropes but where rope is to be used under circumstances such as would cause it to come into contact with objects, as in the case of drilling cable, hoisting ropes, and the like, the use of a protective covering of vulcanizing material is highly beneficial so far as the rubbing or chafing of the fibers is concerned. In connection with this feature of the invention, the protecting covering or sheathing used on the rope is also advantageous in those instances where the latex is unvulcanized in the interior of the rope. That is, the unvulcanized latex is more likely to work out of the rope when the latter is placed in use, than would be the case if all of the latex within the rope was vulcanized and, therefore, the protective covering serves as a retaining sheathing to prevent the loss of the unvulcanized latex.

With these and other objects in view, there is incorporated in the rope or cordage an agent or substance which has, in addition to a lubricating characteristic in the sense in which that term is used in the cordage art, a binding or cementitious characteristic, together with lubricating qualities, and preferably electrical insulating qualities as more particularly hereinafter pointed out.

The material employed is any one of a large class of compounds susceptible of vulcanization so as to form an insoluble resilient body or cementitious body between the rope or cordage. In the preferred adaptation of the invention use is made of rubber latex compound, such as rubber latex, guayule and crepe rubber dissolved in warm oil, but other materials, such as a mixture of rubber with natural or artificial resins or natural or prepared asphaltic compounds may be used, depending upon the lubricating qualities desired to be imparted to the rope. Amongst the natural resins that may be used might be mentioned manila gum; as an artificial resin bakelite might be mentioned; as an example of natural asphaltic compounds elaterite is suggested; while stearine pitch or coal tar are given as examples of prepared asphaltic compounds. However, the commercial rubber latex is preferred as it lends greater strength to the finished product.

Before incorporation in the material of which the rope or cordage is formed, a suitable vehicle is combined with the latex to insure its distribution in the rope or cordage during the formation of the latter. In case this vehicle is not of a character desired to be left in the rope or cordage it is permitted to evaporate or escape before vulcanization is effected either initially or due to the heat generated when the rope or cordage is put in use, but it is preferred that a vehicle be employed which, in itself, is beneficial. For example, the ordinary cordage oil commonly known in the trade as straw oil has been found successful. This so-called straw oil is an oil having a mineral base and is of a light yellow or straw color.

In the accompanying drawing.

In the preferred application of the invention the rubber latex which usually contains about thirty-five per cent of rubber with a small percentage of proteid and mineral matter, stabilized by the addition of a small percentage of ammonia, as now found on the market, is preferably used. In making up the compound there is added to the rubber latex a desired percentage of cordage oil, sulphur, sulphides or poly-sulphides, and in some instances an accelerator for the vulcanizing process, and a metallic oxide, such for example as zinc oxide, to toughen and give body to the vulcanized product. It has been found that cordage oil will dissolve some four per cent of sulphur and by making a slight addition of ammonia and ammonium sulphide, additional sulphide may be dissolved in the compound and any desired additional percentage may be added by emulsification, inasmuch as the whole compound will form an emulsion which is for all practical purposes stable and will readily distribute itself in the manner herein pointed out.

Figure 1:
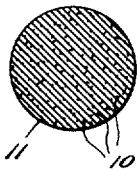
Figure 1 is a transverse sectional view of a rope structure embodying the present improvements.

In the rope illustrated in Fig. 1, the individual fibers or yarns 10 are held together by the rubber latex compound or other vulcanizable compound 11. The fibers or yarns are substantially separately or individually embedded in such compound and are preferably untwisted or slightly twisted, the fibers extending parallel, or substantially so, to each other as well as to the longitudinal center of the rope, or taking approximately the twist of the formed strand.

With this construction, the usual operations of forming up the fibers into yarns and readies, and readies laid into rope, are eliminated and furthermore, the finished rope may conveniently be given a circular cross-section thereby obtaining a continuous and larger wear resisting surface.

Figure 2:
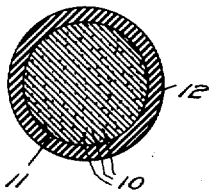
Fig. 2 is a like view of a modified rope containing the invention.

In the rope of Fig. 2 the fibers 10 are similarly held together by the compound 11 and the rope made circular in cross-section, as in Fig. 1, but, in this modification the exterior wearing surface of the rope is provided with a protecting covering 12 preferably of the same compound as is used for securing together the fibers or some other compound.

In both of these forms of the invention it will be readily appreciated that load on the rope will not be imposed upon any one group of fibers but will be carried by all of them collectively. By the same token, it will be utterly impossible for any particular group of fibers to be projected or extruded beyond any other fibers so as to be positioned beyond the normal plane of the wearing surface of the rope. Therefore, wear cannot be imposed on any one portion of the rope but, on the contrary, such wear as is caused by the chafing or rubbing of the rope will be substantially evenly distributed over the entire exterior thereof.

Figure 3:
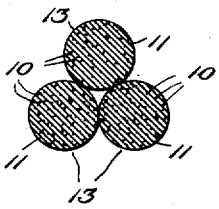
Fig. 3 is a similar view showing a still further modification.

In Fig. 3 the rope is made of a plurality of strands 13 laid together, but each strand is made in accordance with Fig. 1, the fibers 10 of the yarns $10^a$ being untwisted or slightly twisted, and separately or individually embedded in the vulcanizable compound 11 by which they are bonded together. In this form of the invention the strands may be or may not be vulcanized together. In this way wear is evenly distributed over the wearing surfaces of the several strands. The structure of Fig. 4 is similar to that of Fig. 3 except that in this modification, the individual strands 13 are provided with the protecting covering 12 of the vulcanized material before being laid and bonded together.

Figure 4:
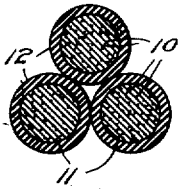
Fig. 4 is a like sectional view showing another form of the invention may take.
Figure 5:
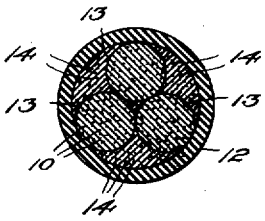
Fig. 5 is a sectional view illustrating a modification embodying features formed in the structures of Figs. 2 and 3.
Figure 6:
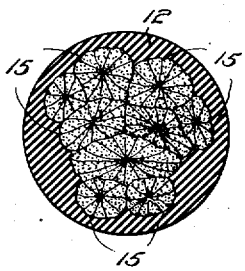
Fig. 6 is a sectional view illustrating a modification embodying features formed in combining or laying together three ropes like 3, 4 or 5,—that is, cabling them together.

In Fig. 5 the rope is made of a plurality of strands 13 or yarns 15, as in Figs. 3 and 4 but, in addition, other fibers 14 or yarns or other material are run between and on the outside of the strands, to make the finished product circular in cross-section. The fibers comprising the strands, as well as those between and around said strands, follow the crevices between strands. In this modification, the exterior of the rope is or may be provided with the protective covering 12 which also serves to prevent displacement or drawing in or pushing out of any of the strands or yarns such as would tend to put any one portion of the rope under excessive strain while another is subjected to excessive chafing.

Likewise, by using the additional fibers 14 and making the rope circular in cross-section, a continuous, unbroken, wearing surface around the rope at all points throughout the length thereof is obtained, as in the ropes of Figs. 1 and 2.

In addition to the advantages hereinbefore pointed out, each of the forms of ropes illustrated possesses one or two additional advantageous features. First, the rubber or other like vulcanizable compound being in contact with and covering, so to speak, each of the fibers as well as the finished rope, all of the fibers as well as the rope itself will be waterproofed. This is a highly desirable property in ropes, particularly those classes of ropes used around water, the life of present-day rope used in water being comparatively short on account of rotting caused by continually becoming wet and then drying.

One method of incorporating the solution or compound in the rope consists in passing one or more slivers or yarns which are entered into the formation of the rope through such solution or the solution is poured on the yarns or slivers on their way to spinning, forming or laying machines, the number of yarns or slivers treated with the solution, and the size thereof, naturally controling the quantity carried into the rope. The yarns or slivers carrying the solution with them are passed into the spinning or forming or laying machines preferably more or less centrally of the remaining yarns or slivers and, due to the pressure and working in the ordinary spinning or forming or laying machines, it is found that the compound or solution distributes itself in a practically uniform manner throughout the whole rope or cordage. The proportions of the various ingredients used in the solution will, of course, vary, depending upon the characteristics desired to be imparted to the finished rope. For instance, if it is desired to have the rope highly lubricated, so to speak, the cordage or rope could contain as high as twelve per cent of cordage oil; one-half of one per cent sulphur; six per cent of rubber latex; two-tenths of one percent zinc oxide and four-hundredths of one per cent of an accelerator such as hexamethylene tetramine. This impregnating solution is preferred but, as stated, it may be altered in accordance with the characteristics desired in the final product. That is, where it is desired to vulcanize only at the surface of the rope, as in the case where the protective sheathing is used, as hereinafter described, less quantities of the vulcanizing agent and accelerator may be used, particularly in the solution with which the interior structural elements of the rope are treated. The quantity of cordage oil or other vehicle may also be varied without detracting from the lubricating properties of the solution as the latex itself will lubricate the rope elements sufficiently to give it increased durability. The fact, experiments have shown conclusively that the cordage oil may be omitted so far as lubrication is concerned.

The particular character of the forming machine is not material, inasmuch as all of these machines subject the fiber to heavy pressure whereby the fibers are consolidated and worked together and this effects the practically uniform distribution of the binding and lubricating substance. The cordage thus formed may be subjected to a vulcanizing temperature and pressure, although practice has demonstrated that even though no additional heat is supplied, the working of the rope through the machine, and the subsequent working of the rope when it is put into use, effects a sufficient vulcanziation to give to the rope or cordage highly desirable and important characteristics which materially prolong its life, both under stresses of use and in resisting deterioration due to exposure to water or atmospheric conditions. That is, it is only necessary to obtain vulcanization at the surface of the rope to obtain highly satisfactory results. This is true because the unvulcanized latex in the interior of the rope constitutes a perfect lubricant and prevents the frictional engagement of fiber on fiber or element on element creating heat to a degree that will be detrimental to the rope. Furthermore, the rope or cordage thus prepared is found to possess important electrical resistance or insulating qualities which particularly adapt it for use as hand lines in the repair or running of wires liable to be charged with high tension current.

The vulcanization results in binding the fibers together, but at the same time the elastic characteristics of the binding agent permits of the necessary flexing of the rope or cordage, or, in other words, the relative movement of the fibers without causing disruption of the fibers themselves. At the same time there is little or no tendency of the binding agent to work out from between the fibers, so that even after long and heavy work the interior of a rope remains in condition to bear its proportion of strain and there will be found but little, if any, evidence of pulverization, such as ordinarily occurs. In fact, it has been found that in well cables, even when a "draw" occurs, the effect of wear on the projecting portions of the cable does not result in so rapid disintegration as ordinarily sets in, because of the fact that the remaining parts of the worn fibers are bound together and held in place, while the other fibers are bound together and held in place.

In certain classes of cordage, particularly small cordage or twines to which a covering of starch is applied, it is found that the use of a rubber-like compound is of material advantage in that it maintains the softness and flexibility without imparting the ability of the cordage to retain the starch coating, and in all instances it is found that the color and appearance of the cordage is not materially affected, unless the vulcanizing temperature be carried too high. Therefore, it may be desirable in some instances to use one of the so-called cold vulcanizing processes, especially if it is desired to initially vulcanize only that portion of the compound binding the fibers together. This is especially true in those instances where a protective sheathing is provided on the rope. In such instances as these, the unvulcanized latex in the interior, acting as a lubricant, reduces friction, and the consequent creation of heat to a minimum. For instance, in fiber ropes with the latex vulcanized at the surface only, and a sheathing on the exterior, tests made by running the ropes over sheaves have shown that the maximum temperatures in the interior of the rope have been far below that at which the fibers would be detrimentally affected.

When the rope is made up of slivers, the fibers are substantially parallel and preferably substantially without twist, the vulcanized elastic colloid serving to hold the fibers in form, but, of course, a plurality of slivers may be combined and each sliver may have a wear resisting covering if so desired, as in known classes of rope.

Figure 7:
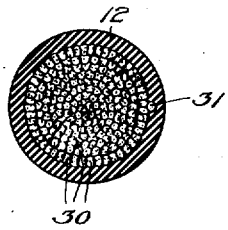
Fig. 7 is a cross section of a modified rope structure.
Figure 8:
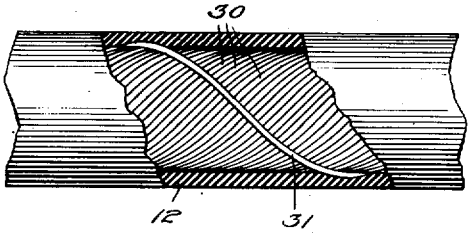
Fig. 8 is an elevational view, partly broken away, of the rope shown in Fig. 7.

Insofar as the covering of rubber is concerned, it is, of course, not limited in its use to the particular forms of rope shown in Figs. 1 to 6,—that is, those forms of rope wherein the fibers are more or less parallel and cemented together instead of being spun as in the ordinary methods of making rope. In view of this, in Figs. 7 and 8, there is shown a piece of cordage of ordinary construction consisting of a plurality of spun yarns 30 twisted together in accordance with common practices. To this strand there is applied a vulcanized rubber sheath which will protect the fibers against chafing as in the previously described constructions. Where the piece of cord consists of a plurality of strands, each formed of a plurality of yarns, there is necessarily a series of spirally extending grooves in the surface of the rope throughout the length of the latter and these grooves become filled with rubber when the cover is applied so that the rubber extending into such grooves will prevent slippage or creepage of the rubber covering on the rope. However, where the cordage has a substantially smooth exterior surface, as in the case of a strand composed of a multiplicity of yarns such as illustrated in Figs. 7 and 8, it is quite often desirable to lay a yarn 31 around the surface of a rope before applying the rubber covering. Due to the pressure exerted in applying the rubber covering this yarn 31 tends to form an interlock between said cover and strand proper whereby creeping or slipping of the cover on the fiber center is prevented. It should also be mentioned that instead of relying upon this interlocking yarn 31 or upon the rubber lying in the spiral grooves in the surface of the spiral center, the cover may be vulcanized on the fiber center to prevent slippage. This is especially true in those forms of the present rope wherein the fibers are substantially untwisted but are cemented together. Furthermore, the feature of providing a rubber covering for protective purposes is applicable to other forms of rope, such as wire ropes or cables. That is, the substitution of wire elements for the vegetable fibers is immaterial so far as the use of the protective covering of vulcanized rubber is concerned. The protective covering, shown in the present instance, can be applied to wire rope with the same advantageous results obtained in connection with fiber rope. In fact this use of the protective covering gives additional advantages. Not only is the displacement of the individual wire strands prevented, as in the case of fiber rope, but in running an uncovered wire rope over sheaves, the wires at the surface break, oftentimes resulting in persons receiving cuts which bring on blood poisoning and, consequently, claims against the employer for damages. Such occurrences as these are impossible where the protective vulcanized rubber covering is used. Again, where the wire rope comes in contact with water, the protective covering eliminates rusting and consequent deterioration of the rope It will also be understood that the use of the latex compound for cementing the fibers together is not limited to ropes wherein the individual fibers are arranged as shown in Figs. 1 to 6. Ropes made up of yarns, for instance, as illustrated in Figs. 7 and 8, may be treated with the solution the same as has been described in connection with the ropes shown in Figs. 1 to 6. In other words, the following claims are not to be limited to any particular fiber arrangement except in those claims where specific arrangements or constructions are expressly included.

What I claim is:

1. A rope or cordage structure formed of vegetable fibers having incorporated therein and substantially uniformly distributed between the fibers a compound of colloid rubber and cordage oil.

2. A rope or cordage structure formed of vegetable fibers and having incorporated therein and substantially uniformly distributed between the fibers a compound of colloid rubber, sulphur and cordage oil.

3. A rope or cordage structure formed of vegetable fibers and having incorporated therein and substantially uniformly distributed between the fibers a compound of colloid rubber, sulphur, a metallic oxide and cordage oil.

4. A rope or cordage structure formed of vegetable fibers having incorporated therein a vulcanized compound of colloid rubber, oil, sulphur, a metallic oxide and an accelerator.

5. A rope or cordage structure formed of vegetable fibers having incorporated therein a vulcanizable compound comprising twelve per cent or less of cordage oil, approximately one-half of one per cent of sulphur, approximately six per cent of rubber latex, approximately two-tenths of one per cent of zinc oxide, and approximately four-hundredths of one per cent of an accelerator.

6. As a new article of manufacture, a rope of circular cross-section composed of fibers lying substantially parallel to the longitudinal center of the rope with all of said fibers cemented or held together by a vulcanized compound, and a covering of said vulcanized material enclosing the rope proper.

7. A rope structure comprising a plurality of strands laid together in twisted relation to form the finished rope, each of said strands being of circular cross-section and composed of fibers lying substantially parallel to the longitudinal center of said strand, all of said fibers being cemented or held together by a vulcanized compound, and a covering of said vulcanized material enclosing each strand.

8. A rope or cordage structure composed of a plurality of structural elements and having distributed therethrough a lubricant formed of a compound comprising unvulcanized colloid rubber, whereby the creation of heat within said elements by internal friction is prevented, said lubricant being vulcanized at the exterior surface of the rope and a protective covering on said surface.

9. A rope or cordage structure composed of a plurality of structural elements and having distributed therethrough a lubricant in the form of colloid rubber, whereby the creation of heat within said elements by internal friction is prevented, said colloid rubber being vulcanized only at the surface of the rope.

10. A rope or cordage structure composed of a plurality of structural elements and having incorporated therein in the interior thereof a lubricant in the form of unvulcanized colloid rubber to reduce the generation of heat within said elements by internal friction.

11. A rope or cordage structure composed of a plurality of structural elements and having incorporated in the interior thereof a lubricant in the form of unvulcanized latex solution to reduce the generation of heat within said elements by internal friction.

HAROLD G. METCALF.